US011828158B2

United States Patent
Li et al.

(10) Patent No.: US 11,828,158 B2
(45) Date of Patent: Nov. 28, 2023

(54) SYSTEMS AND METHODS FOR CEMENT EVALUATION THROUGH TUBING USING SHORT-TERM FREQUENCY RESPONSES

(71) Applicant: Baker Hughes Oilfield Operations LLC, Houston, TX (US)

(72) Inventors: Baoyan Li, Houston, TX (US); Elan Yogeswaren, Houston, TX (US); Marc Ramirez, Houston, TX (US); Joseph Olaiya, Houston, TX (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 0 days.

(21) Appl. No.: 17/850,443

(22) Filed: Jun. 27, 2022

(65) Prior Publication Data

US 2023/0003913 A1 Jan. 5, 2023

Related U.S. Application Data

(60) Provisional application No. 63/216,976, filed on Jun. 30, 2021.

(51) Int. Cl.
| | |
|---|---|
| G01V 1/48 | (2006.01) |
| G01V 1/40 | (2006.01) |
| G01V 1/50 | (2006.01) |
| E21B 47/005 | (2012.01) |

(52) U.S. Cl.
CPC .............. *E21B 47/005* (2020.05); *G01V 1/48* (2013.01); *G01V 1/50* (2013.01); *G01V 1/40* (2013.01)

(58) Field of Classification Search
CPC ............ E21B 47/005; G01V 1/48; G01V 1/50
USPC ........................................................... 367/35
See application file for complete search history.

(56) References Cited

U.S. PATENT DOCUMENTS

| | | |
|---|---|---|
| 2014/0056101 A1 | 2/2014 | Vu |
| 2015/0218930 A1 | 8/2015 | Zeroug |
| 2019/0324166 A1 | 10/2019 | Lolla |
| 2020/0173273 A1 | 6/2020 | Thiruvenkatanathan |

OTHER PUBLICATIONS

"Digital Signal Processing with Short Term Fourier Transforms", Application Demonstration, www.maplesoft.com (Year: 2004).*

(Continued)

*Primary Examiner* — Ian J Lobo
(74) *Attorney, Agent, or Firm* — HOGAN LOVELLS US LLP (57) ABSTRACT

In at least one embodiment, a well inspection method and system enables transmission of an acoustic signal from a well inspection tool into a well structure and reception of return signals from the well structure at an array of receivers on the well inspection tool. The method and system enable performing of Short-Term Fourier Transform (STFT) on the return signals to generate spectrogram data that is used to determine short-term power spectra of the return signals. Time-dependent frequency response and location-dependent waveform propagation patterns are identified from the short-term power spectra. Cement bonding conditions is determined based on pattern matching using the time-dependent frequency response patterns and using the location-dependent waveform propagation patterns.

14 Claims, 5 Drawing Sheets

(56) References Cited

OTHER PUBLICATIONS

Darsan et al., "A Review on Short-Time Fourier Transforms and Its Applications", Studia Rosenthaliana (Journal for the Study of Research), vol. XII, Issue XII, ISSN No. 1781-7838, pp. 19-25 (Year: 1220).*
International Search Report and Written Opinion dated Sep. 23, 2022 in corresponding PCT Application No. PCT/US22/35275.
Han et al., "Auto-detection of acoustic emission signals from cracking of concrete structures using convolutional neural networks: Upscaling from specimen," Dec. 30, 2021, Expert Systems with Applications, vol. 186, 9 pages.

* cited by examiner

SYSTEMS AND METHODS FOR CEMENT EVALUATION THROUGH TUBING USING SHORT-TERM FREQUENCY RESPONSES

CROSS-REFERENCE TO RELATED APPLICATIONS

This application is related to and claims the benefit of priority from U.S. Provisional Application 63/216,976, filed Jun. 30, 2021, and titled SYSTEMS AND METHODS FOR CEMENT EVALUATION THROUGH TUBING USING SHORT-TERM FREQUENCY RESPONSES, the entire disclosure of which is incorporated by reference herein for all intents and purposes.

BACKGROUND

1. Technical Field

This disclosure relates generally to oilfield equipment and more particularly to systems and methods for evaluating cement-bonding quality through tubing or multiple casings.

2. Description of the Prior Art

Evaluation of cement-bonding quality can be a challenging process as it requires interpret of acoustic measurements to evaluate cement-bonding quality in a through-tubing process, such as for plugged and abandoned (P&A) wells. For acoustic logging-related through-tubing, most of energy generated by a transmitter may be confined in the tubing because of high impedance contrast of the tubing and fluid. Variances in received waveforms as a result of cement bonding conditions may not be significant or may not be observable. To address this, frequency responses of receivers can be analyzed to recognize features on a frequency spectra of a received waveforms that may be a result of cement bonding conditions. However, such features can be trivial and difficult to reliably identify. In addition, casing-debonding and cement-debonding may not be differentiable using currently-available techniques.

SUMMARY

In at least one embodiment, a well inspection method is disclosed. The method includes transmitting an acoustic signal from a well inspection tool into a well structure and receiving return signals from the well structure at an array of receivers on the well inspection tool. The method includes performing Short-Term Fourier Transform (STFT) on the return signals to generate spectrogram data. A further step in the method is to determine short-term power spectra from the spectrogram data. A step to identify time-dependent frequency response patterns and location-dependent waveform propagation patterns of the short-term power spectra is performed in the method. The method also includes determining cement bonding conditions based on pattern matching using the time-dependent frequency response patterns and using the location-dependent waveform propagation patterns.

In at least one embodiment, a system for well inspection is also disclosed. The system includes a well inspection tool to transmit an acoustic signal into a well structure, an array of receivers on the well inspection tool to receive return signals from the well structure, and at least one processor and memory comprising instructions that when executed by the at least one processor enable the system to perform specific functions. A function is to perform Short-Term Fourier Transform (STFT) on the return signals to generate spectrogram data. Another function is to determine short-term power spectra from the spectrogram data. A further function is to identify time-dependent frequency response and location-dependent waveform propagation patterns of the short-term power spectra. The specific functions include a function to determine cement bonding conditions based on pattern matching using the time-dependent frequency response patterns and using the location-dependent waveform propagation patterns.

BRIEF DESCRIPTION OF DRAWINGS

Some of the features and benefits of the present disclosure having been stated, others will become apparent as the description proceeds when taken in conjunction with the accompanying drawings, in which.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

Figure 1:
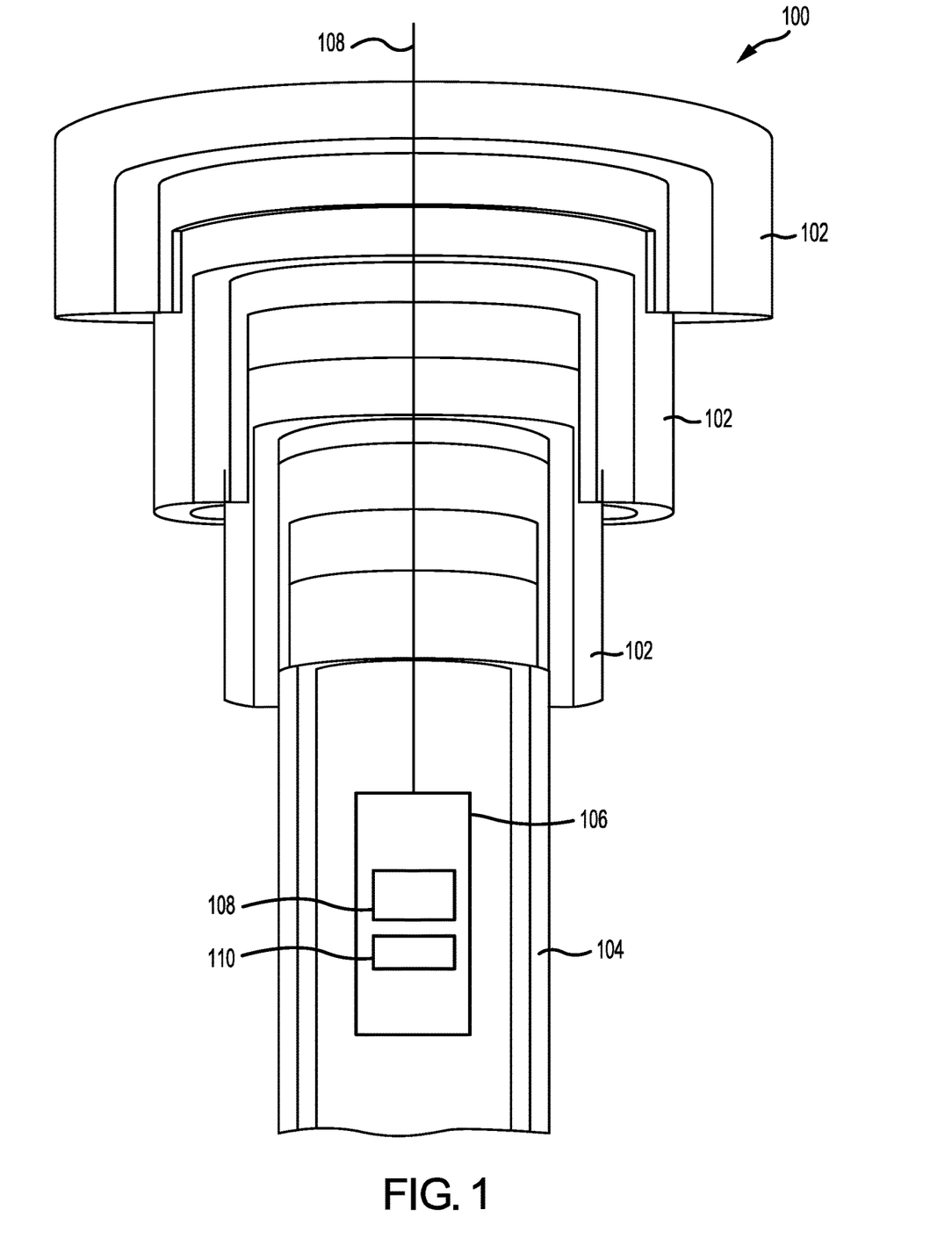
FIG. 1 is a partial cross-sectional view of a well inspection system, illustrating a well with a plurality barriers, such as casing, tubing, cement layers, and the like, in accordance with at least one embodiment.

FIG. 1 is a partial cross-sectional view of a well inspection system, illustrating a well 100 with barriers, such as casing 102, tubing 104, cement layers, and the like, in accordance with at least one embodiment. The well 100 (also referred to herein as a well structure) may be any type of well, including but not limited to conventional and unconventional hydrocarbon producing wells. An inspection tool 106 may be deployed downhole into the well 100 to perform various logging functions, such as detection of various anomalies, such as well defects, eccentricity, flaw structure, topology, integrity, and other information. In at least one embodiment, the inspection tool 106 may include an acoustic-based imaging device for detecting integrity and defects of the well structure. The well 100 may have one or a series of cylindrical metal casing 102 and cement wall layers between the casing layers 102.

As illustrated in FIG. 1, the inspection tool 106 traverses into a wellbore of the well 100 and is used for determining well integrity of the well structure. In at least one embodiment, the inspection tool 106 can be used to determine the integrity of each of the barriers (such as casings and cement layers) of the well 100 and/or of a number of annuli between the barriers. The inspection tool 106 may include an acoustic signal generation and transmission component 108 and an acoustic return signal receiving component 110. The inspection tool 106 may be deployed at the different depths inside the wellbore, and therefore has material and structural integrity to withstand the high pressures and high temperatures at these depths.

In at least one embodiment, the disclosure herein uses a new pattern recognition method in a supported system to evaluate cement quality through-tubing, based at least in part on short-term frequency responses received in acoustic sensor arrays of the inspection tool 106. In at least one embodiment, the method is applicable for both fresh and mature wells and can be performed fully downhole and in a combination of a downhole and a surface-based system.

In at least one embodiment, a solution to the challenges described elsewhere herein uses pattern recognition to analyze short-term frequency responses of an array of receivers (also referred to herein as an array or cluster of acoustic sensors) and to differentiate different cement-bounding conditions from such patterns. In at least one embodiment, a method and system herein can identify time-dependent frequency response patterns and location-dependent waveform propagation patterns that are associated with different cement bonding conditions, such as using a modeled system of Equations (1) to (10) described herein.

Figure 2:
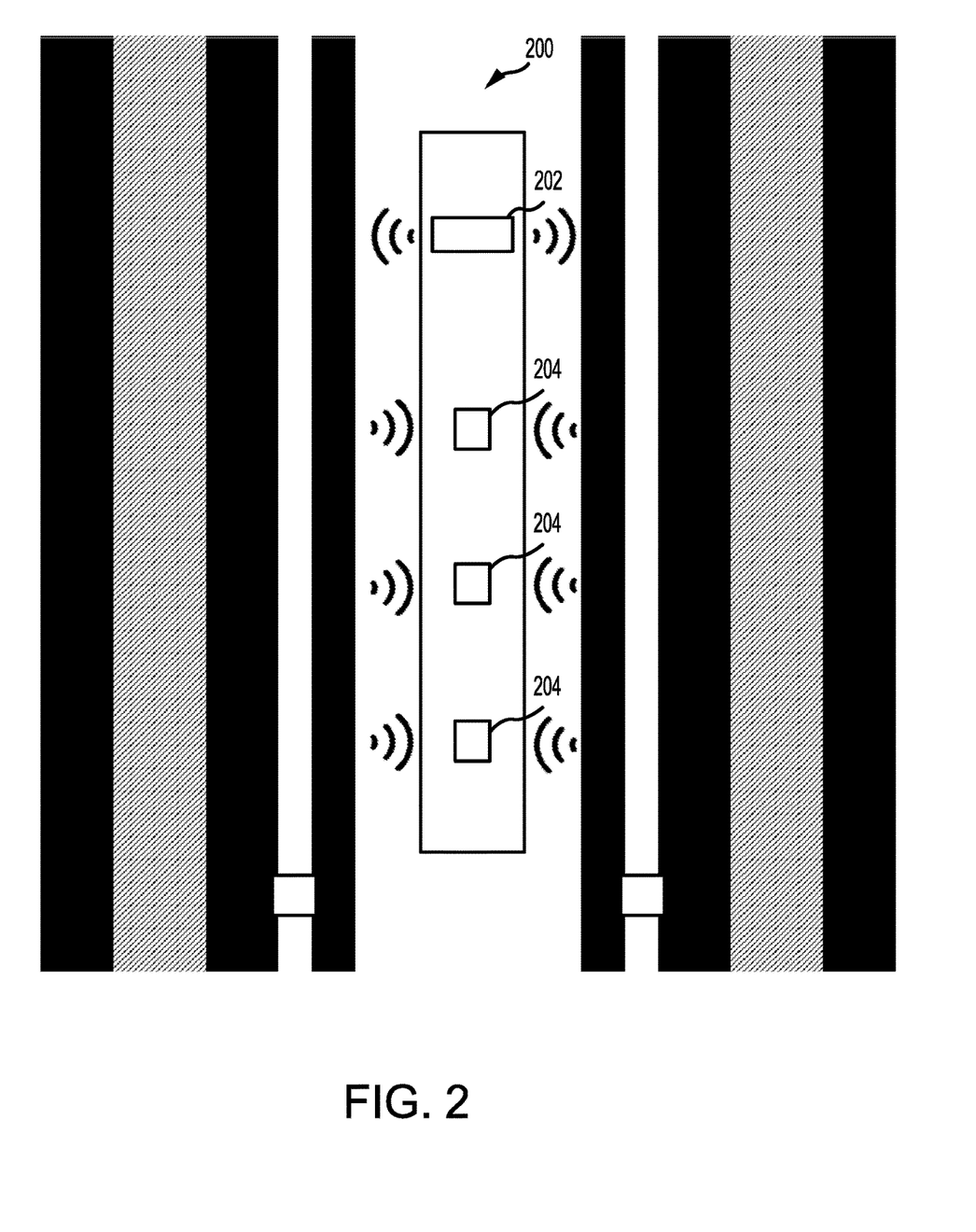
FIG. 2 illustrates an acoustic inspection tool for performing well structure inspection, in accordance with at least one embodiment.

In at least one embodiment, such time-dependent frequency response patterns and location dependent patterns can be used to diagnose cement bonding conditions at a borehole environment within a well 100. Further, short-term Fourier transform (STFT) may be performed on received waveforms that are received by the array of receivers, as illustrated in FIG. 2. In at least one embodiment, the array of receivers may be distributed vertically and/or in the azimuthal direction. Time and location dependent patterns may be extracted from the short-term power spectra of waveforms, as described using a modeled system of Equations (1) to (10), where the waveforms are return signals recorded by the array of receivers. In at least one embodiment, such patterns can then be used for diagnosing the cement bonding conditions by reference to known patterns for different cement bonding conditions.

In at least one embodiment, such a method or diagnosis provides unique features and advantages. In at least one embodiment, a unique feature is the use of an array of receivers that are acoustic sensors and that are used to acquire return signals of propagated waveforms. In at least one embodiment, a further unique features is to use time-dependent frequency response patterns and location-dependent waveform propagation response patterns that are extracted from short-term power spectra associated with the STFT of return signals from the array of receivers.

In at least one embodiment, different cement-bounding conditions may be identified from the time-dependent frequency response patterns and location-dependent waveform propagation response patterns, which can be controlled by forced and natural resonant frequency responses of the array of receivers and by attenuation of propagated waveforms as it travels from the well inspection tool to the borehole and to the array of receivers. In at least one embodiment, pattern matching can be performed for diagnosing cement bonding conditions and not merely to provide indicators. In at least one embodiment, such a method may be applicable to both newly drilled and mature wells that have presence of tubing therein, and may be also applicable to plug and abandon (P&A) wells.

FIG. 2 illustrates a well inspection tool 200 for performing well structure inspection, in accordance with an at least one embodiment. The well inspection tool 200 (also referred to as an acoustic inspection tool) includes an acoustic transmitter 202 for generating and transmitting an acoustic signal into the well 100. In at least one embodiment, the acoustic transmitter 202 generates an acoustic frequency range of 20-80 kHz. The well inspection tool 200 further includes an array of receivers 204 that are acoustic receivers for receiving return signals from the well structure. In at least one embodiment, an array of receivers 204 may be distributed vertically or depth-wise. Data collected from the array of receivers 204 may be used to determine various characteristics of the well structure as set forth in embodiments herein.

Figure 3:
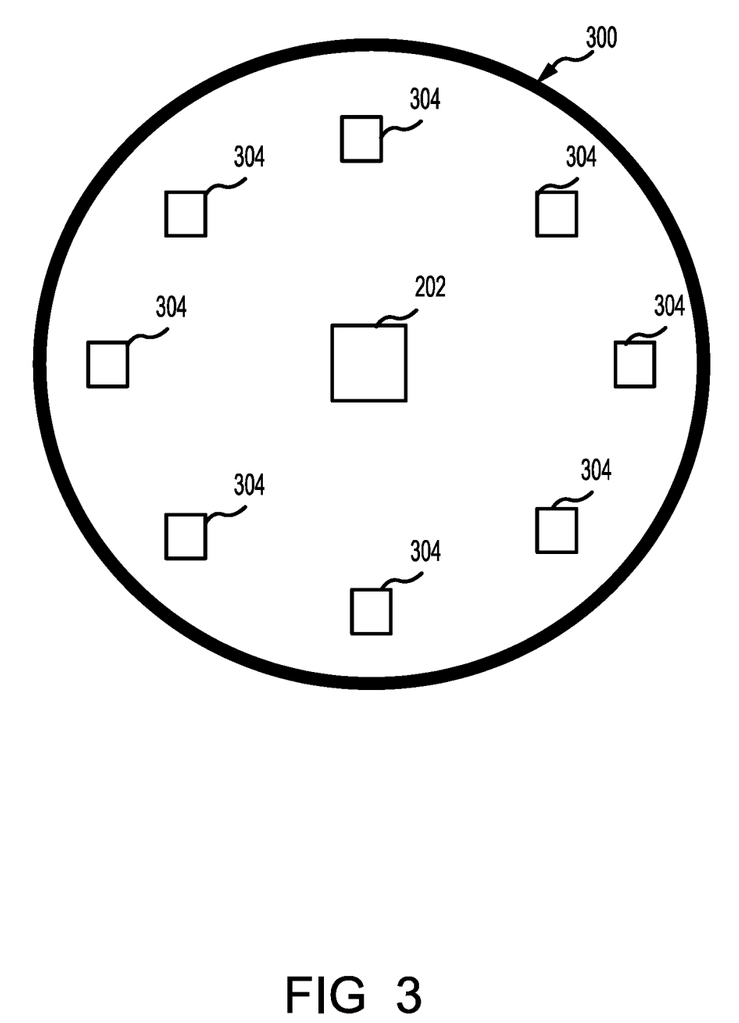
FIG. 3 illustrates an acoustic inspection tool with azimuthally distributed receivers, in accordance with at least one embodiment.

In at least one embodiment, FIG. 3 illustrates a well inspection tool 300 with an acoustic transmitter 202 and an array of receivers 304 that are distributed azimuthally. In at least one embodiment, as discussed with respect to FIG. 2, the well inspection tool 300 uses its acoustic transmitter 202 to generate an acoustic frequency range of 20-80 kHz. The array of receivers 304 are also acoustic receivers that can receive return signals from the well structure. In at least one embodiment, as in the embodiment of FIG. 2, data collected from the array of receivers 304 may be used to determine various characteristics of the well structure as set forth in embodiments herein.

Figure 4:
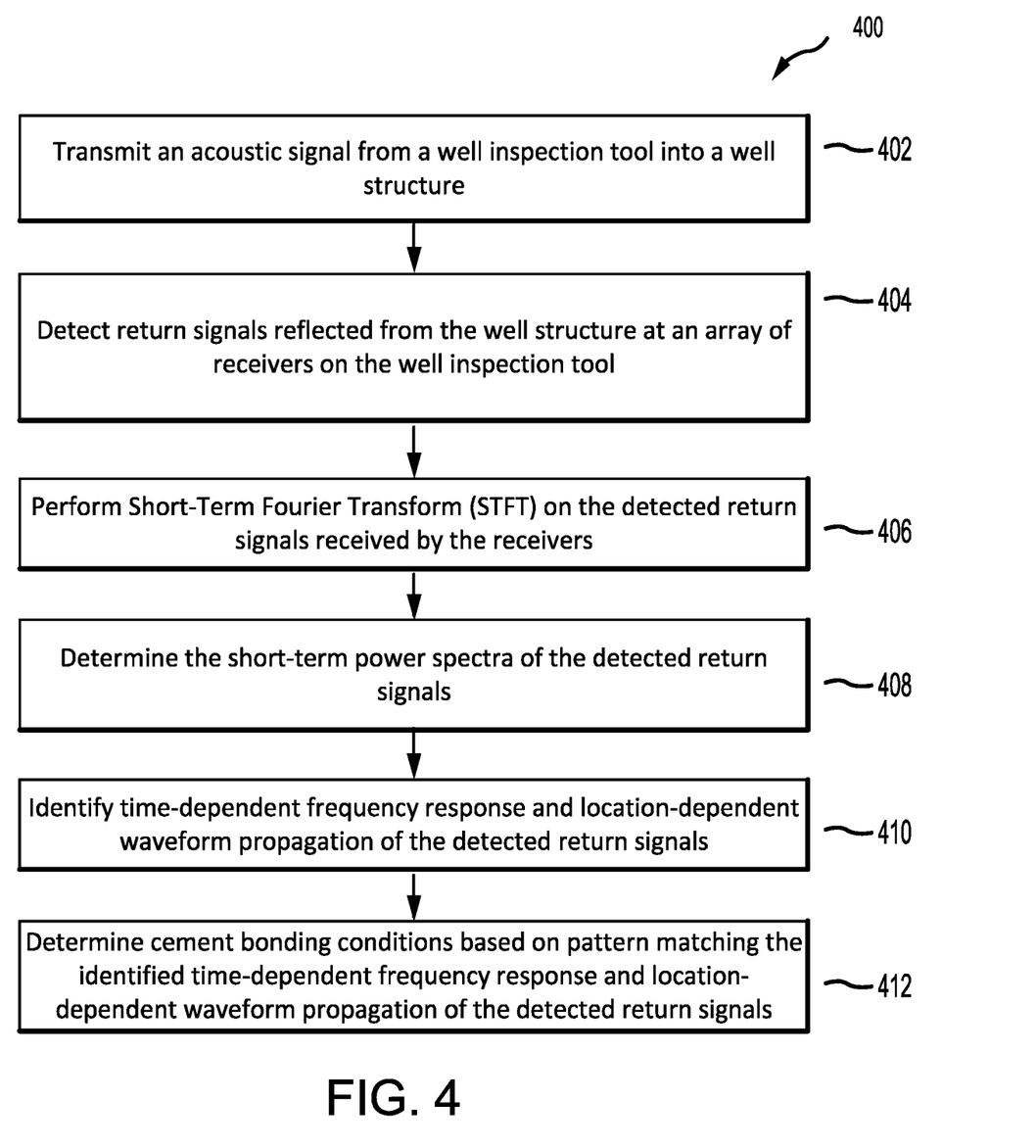
FIG. 4 is a flowchart illustrating a well structure inspection and analysis technique, in accordance with at least one embodiment.

FIG. 4 is a flow diagram 400 illustrating a method of inspecting well structure using the well inspection tools 200, 300 described in FIG. 2 or 3, in accordance with at least one embodiment. For example, the method 400 includes transmitting 402 an acoustic signal from a well inspection tool into a well structure. In at least one embodiment, the method 400 includes use of a swept frequency acoustic interferometry approach. The frequency range may include resonance frequencies of various types of well components, such as tubing, casing, cement, well fluid, and air. Such signals of resonance frequencies may be reflected by respective well components, when present in the well structure.

In at least one embodiment, one or more signals may be transmitted into the well structure with azimuthal considerations such that the well structure may be inspected in all azimuthal directions. The method 400 includes detecting 404 return signals from the well structure at an array of receivers on the well inspection tool. In at least one embodiment, this include receiving the return signals and passing such return signals to a modelling system or other component confirm the frequency range of the return signals as suitable to expected frequency ranges for well inspection.

In at least one embodiment, a further step in method 400 includes performing 406 Short-Term Fourier Transform (STFT) on the return signals that are received or detected by the array of receivers. The STFT performed can result in spectrogram data of the received signals. In at least one embodiment, the method 400 includes determining 408 a short-term power spectra of the return signals by analysis of the spectrogram data. In at least one embodiment, the method 400 also includes identifying 410 time-dependent frequency response patterns and location-dependent waveform propagation patterns of the return signals. This is done using the short-term spectra of the return signals as discussed with respect to Equations (1) to (10) detailed elsewhere in this disclosure.

In at least one embodiment, yet another step of the method 400 includes determining 412 cement bonding conditions based at least in part on pattern matching the time-dependent frequency response patterns and location-dependent waveform propagation patterns identified in step 410. In at least one embodiment, this may be done by a comparison of the time-dependent frequency response patterns and the location-dependent waveform propagation patterns with known patterns of known cement bonding conditions to determine the cement-bonding condition associated with the return signal.

In at least one embodiment, a trained machine-learning model may be used to make such determinations. In at least one embodiment, for example, the known patterns are used to train a machine learning algorithm, such as a neural network, to infer that test patterns classifying test patterns within the known patterns to imply that the test patterns are associated with the same cement-bonding condition as the known cement-bonding condition. In at least one embodiment, the cross correlation feature in Equation (16) provides an activation function to be used with a machine learning algorithm to provide classification for matching patterns between known cement-bonding conditions and test cement-bonding conditions as described with at least reference to Equations (1) to (16) herein.

In some embodiments, an algorithm for analyzing cement bonding conditions through-tubing using short-term frequency responses of acoustic receiver arrays, as described with respect to FIGS. 1-4 and particularly to the method steps in FIG. 4, may be realized, in part, in the detailed sequence of steps as follows. In at least one embodiment, a first set of steps of such an algorithm (such as the first step to the six step described below is for processing known return signals of known cement bonding conditions. A first step of the first set of steps includes selecting a number of time segments, preliminarily, for which known return signals may be subject to this algorithm. The time segments may include a window type g(n) and a window length Nt for performing short-term Fourier transform (STFT).

In at least one embodiment, a second step includes, from the number of time segments in the first step, selecting specific time segments ST7 and ST2 for extracting time-dependent frequency response patterns and for extracting location-dependent waveform propagation patterns of frequency responses after return signals are received at the array of receivers and detected by the appropriate component as being signals intended for well inspection.

In at least one embodiment, a third step of the algorithm includes loading measurement data, such as given by $x_{CB_l,R_i}$, where l=1, 2, . . . L of the array of receivers, to at least one memory to enable one or more processors to perform the algorithm herein. In at least one embodiment, the measurement data may be associated with frequencies for each known cement-bonding condition represented numerically in l=1, 2, . . . L and may be retrieved from the return signals for known cement-bonding conditions. In at least one embodiment, such cement-bonding condition can include free pipe, fully cemented, casing cement debonding, and formation cement debonding conditions.

In at least one embodiment, a fourth step includes performing STFT on waveforms $x_{CB_l,R_i}$ in the measurement data that were acquired by the array of receivers Ri, where i=1, 2, . . . I. In at least one embodiment, this is done as per equations (1) and (3) for each known cement-bonding condition. In at least one embodiment, this fourth step is used to generate or compute respective spectrograms $S_{CB_l,R_i}(m, k)$ as per equation (2), which collectively provides the spectrogram data.

$$X_{CB_l,R_i}(m, k) = \sum_{n=0}^{N-1} x_{CB_l,R_i}(n)g(n-m)W_N^{kn} \quad (1)$$

$$S_{CB_l,R_i}(m, k) = |X_{CB_l,R_i}(m, k)|^2 \quad (2)$$

$$x_{CB_l,R_i}(n) = x_{CB_l,R_i}(nT_s), W_N^{kn} = e^{-j\frac{2\pi}{N}kn} \quad (3)$$

$$f_s = 1/T_s, f_K = \frac{k}{N}f_s \quad (4)$$

In at least one embodiment, a fifth step of the algorithm includes generating or computing partial energies of the return signals at the selected time segments ST1 and ST2 from the spectrogram data of waveforms $x_{CB_l}R_i$, for each known cement-bonding condition l=1, 2, . . . L. In at least one embodiment, this fifth step may be represented as in equations (5) and (6).

$$E_{CB_l,R_i,ST1} = \Sigma_{k=0}^{Np-1} S_{CB_l,R_i}(m_{ST1}, k) \quad (5)$$

$$E_{CB_l,R_i,ST2} = \Sigma_{k=0}^{Np-1} S_{CB_l,R_i}(m_{ST2}, k) \quad (6)$$

In at least one embodiment, a sixth step of the algorithm includes establishing or identifying time-dependent frequency response patterns and location-dependent waveform propagation patterns for each known cement-bonding condition l=1, 2, . . . L. In at least one embodiment, this is represented as in Equation (7).

$$E_{P,CB_l} = [E_{CB_l,R_1,ST1}, E_{CB_l,R_2,ST1}, \ldots, E_{CB_l,R_l,ST1}, E_{CB_l,R_1,ST2}, E_{CB_l,R_2,ST2}, \ldots, E_{CB_l,R_l,ST2}] \quad (7)$$

In at least one embodiment, the first set of steps may be completed in advance of a well inspection to be performed using a well inspection tool.

In at least one embodiment, a second set of steps of the algorithm (such as the seventh step onwards), as described below, is to be performed using a well inspection tool that is sent into a downhole environment. This allows for processing, in part, unknown return signals to be used with pattern matching to the patterns of known return signals corresponding to the known cement bonding conditions from the first set of steps of the algorithm. As such, the second set of steps of the algorithm are associated with some steps illustrated in the method 400 of FIG. 4. In at least one embodiment, a well inspection tool sent into a downhole environment can transmit an acoustic signal into a well structure as in steps 402 of method 400.

In at least one embodiment, the second set of steps in the algorithm starts with a seventh step of the algorithm that allows loading measurement data $x_{depth_j,R_i}$, where j=1, 2, . . . J, of an array of receivers Ri, where i=1, 2, . . . I, and where such measurement data is acquired from a downhole environment of a well or well structure. In at least one embodiment, such a step of the algorithm includes receiving return signals from the well structure at an array of receivers on the well inspection tool from which measurement data is retrieved and loaded to at least one memory to enable one or more processors to perform the algorithm herein.

In at least one embodiment, an eight step of the algorithm includes selecting a depth point [js, je] for diagnosing cement-bonding condition of the downhole environment of the well. In at least one embodiment, therefore, measurement data may be collected at multiple depth points, and then certain depth points of interest may be analyzed by such an algorithm. In at least one embodiment, however, it is possible to only obtain measurement data at the certain depth points of interest. In at least one embodiment, a ninth step of the algorithm includes setting a depth counter as represented in Equation (4).

$$j_C = j_s \quad (8)$$

In at least one embodiment, the seventh to ninth steps of the algorithm may be cumulatively represented as step 404 of method 400 in FIG. 4.

In at least one embodiment, a tenth step of the algorithm includes performing STFT on the waveforms $$x_{depth_{j_C}, R_i}$$

acquired by the array of receivers Ri, where i=1, 2, ... 1, at the depth $depth_{j_c}$. In at least one embodiment, this is done as per Equations (8) and (10) for each unknown cement-bonding condition. In at least one embodiment, this tenth step is to generate or compute respective spectrograms $$S_{depth_{j_c}, R_i}(m, k)$$

as per equation (9), which collectively provides the spectrogram data. In at least one embodiment, this tenth step of the algorithm may be represented as step 406 of method 400 in FIG. 4. In at least one embodiment, therefore, this tenth step performs the Short-Term Fourier Transform (STFT) on individual ones of the return signals to generate individual ones of spectrograms that are cumulated to generate the spectrogram data.

$$X_{depth_{j_c}, R_i}(m, k) = \sum_{n=0}^{N-1} x_{depth_{j_c}, R_i}(n) g(n-m) W_N^{kn} \quad (9)$$

$$S_{depth_{j_c}, R_i}(m, k) = |X_{depth_{j_c}, R_i}(m, k)|^2 \quad (10)$$

$$x_{depth_{j_c}, R_i}(n) = x_{depth_{j_c}, R_i}(nT_s), W_N^{kn} = e^{-j\frac{2\pi}{N}kn} \quad (11)$$

$$f_s = 1/T_s, f_K = \frac{k}{N} f_s \quad (12)$$

In at least one embodiment, an eleventh step of the algorithm includes computing the partial energies of the signals at the selected time segment ST1 and ST2 from the spectrogram data of the waveforms $x_{depth_j, R_i}$ for each known cement-bonding condition. In at least one embodiment, this eleventh step may be represented as in equations (13) and (14) and as a determination of the short-term power spectra in step 408 of method 400 in FIG. 4.

$$E_{depth_{j_c}, R_i, ST1} = \sum_{k=0}^{N_p - 1} S_{depth_{j_c}, R_i}(m_{ST1}, k) \quad (13)$$

$$E_{depth_{j_c}, R_i, ST2} = \sum_{k=0}^{N_p - 1} S_{depth_{j_c}, R_i}(m_{ST2}, k) \quad (14)$$

In at least one embodiment, a twelfth step of the algorithm includes establishing or identifying time-dependent frequency response patterns and location-dependent waveform propagation patterns for each known cement-bonding condition at each $depth_{j_c}$. In at least one embodiment, this is represented as in Equation (15) and in step 410 of the method 400 in FIG. 4.

$$E_{P, depth\, j_c} = E_{depth\, j_c, R_1, ST1}, E_{depth\, j_c, R_2, ST1}, \ldots \quad (15)$$

$$[\ldots, E_{depth\, j_c, R_I, ST1}, E_{depth\, j_c, R_1, ST2}, E_{depth\, j_c, R_2, ST2}, \ldots, E_{depth\, j_c, R_I, ST2}]$$

In at least one embodiment, a thirteenth step of the algorithm includes generating or computing cross correlation coefficients $\rho_{j_c, l}$, between the extracted pattern response of the array of receivers Ri, where i=1, 2, ... I, at $depth_{j_c}$ and the pattern responses of the array of receivers Ri, where i=1, 2, ..., 1, for the known cement bonding conditions. In at least one embodiment, the cross correlation may be represented as in Equation (16).

$$\rho_{j_c, l} = \frac{E_{P, depth\, j_c} E_{P, CB_l}^T}{\left(E_{P, depth\, j_c} E_{P, depth\, j_c}^T\right)^{1/2} \left(E_{P, CB_l} E_{P, CB_l}^T\right)^{1/2}}, \quad (16)$$

where $l = 1, 2, \ldots L$

In at least one embodiment, a fourteenth step of the algorithm includes searching, identifying, or determining the maximum $\rho_{j_c, max}$ of the cross correlation coefficient sequence $\{\rho_{j_c, l}, l=1, 2, \ldots, L\}$. In at least one embodiment, this information can then be used to determine the cement-bonding condition $$BC|_{\rho_{j_c, max}}$$

at a intended depth in the downhole environment corresponding to the maximum $\rho_{j_c, max}$ of the cross correlation coefficient sequence.

In at least one embodiment, a fifteenth step and a sixteenth step of the algorithm are to set the searched cement-bonding condition for $depth_{j_c}$ using Equation (17) and to update a depth counter using Equation (18), respectively.

$$BC_{j_c} = BC|_{\rho_{j_c, max}} \quad (17)$$

$$j_c = j_c + 1 \quad (18)$$

The diagnosis of the downhole environment can be stopped once the condition $j_C > j_e$, following updates in Equation (18), is met. In at least one embodiment, the tenth step of the algorithm is performed so that all intended depths are analyzed. In at least one embodiment, one or more steps from the thirteenth step to the sixteenth step of the algorithm may be represented in step 412 of the method 400 in FIG. 4.

Figure 5:
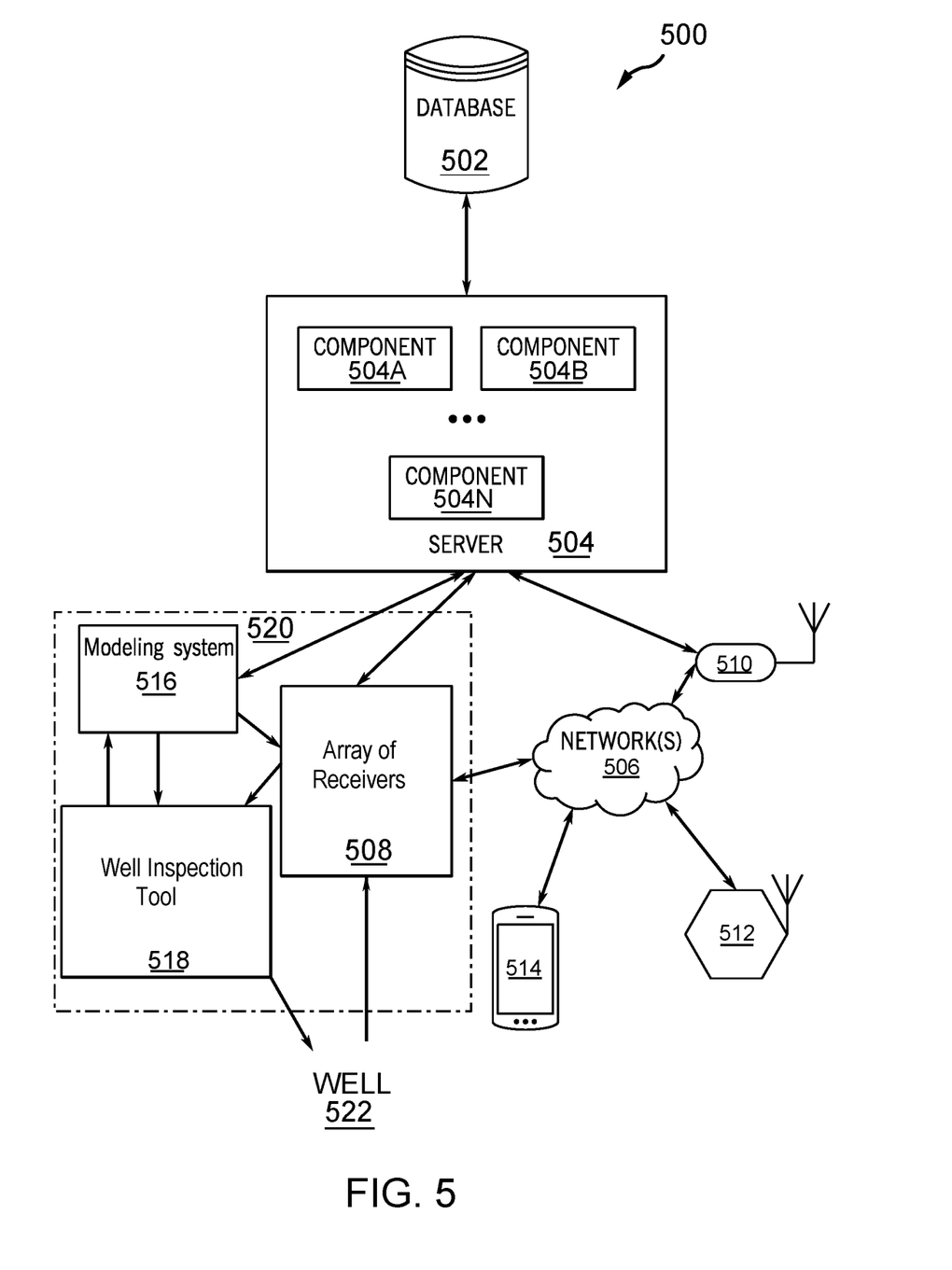
FIG. 5 is a block diagram of computer and network aspects for a well inspection system as described in FIGS. 1-4 herein, in accordance with at least one embodiment.

In at least one embodiment, computer and network aspects 500 for a downhole system as illustrated in FIG. 5, may be used as described herein. In at least one embodiment, these computer and network aspects 500 may include a distributed system. In at least one embodiment, a distributed system 500 may include one or more computing devices 512, 514. In at least one embodiment, one or more computing devices 512, 514 may be adapted to execute and function with a client application, such as with browsers or a standalone application, and are adapted to execute and function over one or more network(s) 506.

In at least one embodiment, a server 504, having components 504A-N may be communicatively coupled with computing devices 512, 514 via network 506 and via a receiver device 508, if provided. In at least one embodiment, components 512, 514 include processors, memory, and random-access memory (RAM). In at least one embodiment, server 504 may be adapted to operate services or applications to manage functions and sessions associated with database access 502 and associated with computing devices 512, 514. In at least one embodiment, a server 504 may be associated with an array of receivers 508 of a downhole tool 520.

In at least one embodiment, server 504 may be at a wellsite location, but may also be at a distinct location from a wellsite location. In at least one embodiment, such a server 504 may support a downhole tool or wireline system 520 for analysis of a well structure in a downhole environment and to perform well structure inspection of a well 522. Such a well inspection tool 520 may be partly downhole and partly at a surface level. Such a downhole tool 520 may include a well inspection tool 518 to perform at least part of the functions described throughout herein.

There may be a modelling system 516 within a downhole tool 520 or separate from the downhole tool 520, at a server 504. In at least one embodiment, such a modelling system may be provided to perform part of the first set of steps of the algorithm to recalibrate the downhole tool 520 using known cement bonding conditions. In at least one embodiment, the modelling system 516 may be pre-calibrated on a surface level using known cement bonding conditions or simulations (or other representations, including images) thereof. The subsystems 508, 516, 518 of the downhole tool may be encased in one or more computing devices having at least one processor and memory so that the at least one processor can perform functions based in part on instructions from the memory executing in the at least one processor. In at least one embodiment, even though illustrated together, the system boundaries of each module 508, 516, 518 may be around a distributed system having the subsystems in different geographic locations, including downhole and surface areas.

In at least one embodiment, an array of receivers 508 of a downhole tool 520 is provided to inspect a downhole environment of a well 522. In at least one embodiment, a system for determining cement bonding conditions includes a wireline system for the analysis, where such a system may be adapted to transmit, either through wires or wireless, information received therein, from an array of sensors back to the surface. In at least one embodiment, modeling performed using a modeling system 516 may be associated with calibration or pre-calibration of known cement bonding conditions (and representations thereof) that may be recorded within a modeling system 516.

The modeling system 516 can communicate to a well inspection tool 518 and to an array of receivers 508 to enable determination of cement bonding conditions of a well 522 using models of known cement bonding conditions stored in the modeling system 516. For example, each model may require specific signals associated with specific ones of the cement bonding conditions to verify matching patterns using the above-described algorithm. Such signals may include acoustic signals to be applied from an acoustic transmitter of the well inspection tool 518. Detected return signals to the array of receivers 508 may be used to determine the cement bonding conditions by pattern matching using the time-dependent frequency response and using the location-dependent waveform propagation patterns from the returned signals. In at least one embodiment, therefore, the system 500 enables the at least one processor (such as from components 512, 514) to access the measurement data and to access patterns of known cement-bonding conditions to perform the pattern matching using the time-dependent frequency response and using the location-dependent waveform propagation patterns.

In at least one embodiment, such returned signals may be received in the array of receivers 508 and transmitted from there. In at least one embodiment, a server 504 may function as a setting device (with the acoustic transmitter of the well inspection tool providing the actual acoustic signal and the array of sensors receiving a returned signal). In at least one embodiment, however, the server 504 may also perform other functions described throughout herein and at least as to the algorithm described herein.

In at least one embodiment, one or more component 504A-N may be adapted to function as a signal provisioning device within a server 504 to enable the acoustic transmitter to transmit its signals at the frequency ranges described throughout herein. In at least one embodiment, one or more components 504A-N may include one or more processors and one or more memory devices adapted to function as a detector or receiver device, while other processors and memory devices in server 504 may perform other functions.

In at least one embodiment, a server 504 may also provide services or applications that are software-based in a virtual or a physical environment (such as to support the simulations referenced herein). In at least one embodiment, when server 504 is a virtual environment, then components 504A-N are software components that may be implemented on a cloud. In at least one embodiment, this feature allows remote operation of a system for determining cement bonding conditions formation using a wireline system that includes a well inspection tool, as discussed at least in reference to all the figures herein. In at least one embodiment, this feature also allows for remote access to information received and communicated between any of aforementioned devices. In at least one embodiment, one or more components 504A-N of a server 504 may be implemented in hardware or firmware, other than a software implementation described throughout herein. In at least one embodiment, combinations thereof may also be used.

In at least one embodiment, one computing device 510-514 may be a smart monitor or a display having at least a microcontroller and memory having instructions to enable display of information monitored by an array of receivers 508. In at least one embodiment, one computing device 510-512 may be a transmitter device to transmit directly to a receiver device or to transmit via a network 506 to an array of receivers 508 and to a server 504, as well as to other computing devices 512, 514.

In at least one embodiment, other computing devices 512, 514 may include portable handheld devices that are not limited to smartphones, cellular telephones, tablet computers, personal digital assistants (PDAs), and wearable devices (head mounted displays, watches, etc.). In at least one embodiment, other computing devices 512, 514 may operate one or more operating systems including Microsoft Windows Mobile®, Windows® (of any generation), and/or a variety of mobile operating systems such as iOS®, Windows Phone®, Android®, BlackBerry®, Palm OS®, and/or variations thereof.

In at least one embodiment, other computing devices 512, 514 may support applications designed as internet-related applications, electronic mail (email), short or multimedia message service (SMS or MMS) applications and may use other communication protocols. In at least one embodiment, other computing devices 512, 514 may also include general purpose personal computers and/or laptop computers running such operating systems as Microsoft Windows®, Apple Macintosh®, and/or Linux®. In at least one embodiment, other computing devices 512, 514 may be workstations running UNIX® or UNIX-like operating systems or other GNU/Linux operating systems, such as Google Chrome OS®. In at least one embodiment, thin-client devices, including gaming systems (Microsoft Xbox®) may be used as other computing device 512, 514.

In at least one embodiment, network(s) 506 may be any type of network that can support data communications using various protocols, including TCP/IP (transmission control protocol/Internet protocol), SNA (systems network architecture), IPX (Internet packet exchange), AppleTalk®, and/or variations thereof. In at least one embodiment, network(s) 506 may be a networks that is based on Ethernet, Token-Ring, a wide-area network, Internet, a virtual network, a virtual private network (VPN), a local area network (LAN), an intranet, an extranet, a public switched telephone network (PSTN), an infra-red network, a wireless network (such as that operating with guidelines from an institution like the Institute of Electrical and Electronics (IEEE) 802.11 suite of protocols, Bluetooth®, and/or any other wireless protocol), and/or any combination of these and/or other networks.

In at least one embodiment, a server 504 runs a suitable operating system, including any of operating systems described throughout herein. In at least one embodiment, server 504 may also run some server applications, including HTTP (hypertext transport protocol) servers, FTP (file transfer protocol) servers, CGI (common gateway interface) servers, JAVA® servers, database servers, and/or variations thereof. In at least one embodiment, a database 502 is supported by database server feature of a server 504 provided with front-end capabilities. In at least one embodiment, such database server features include those available from Oracle®, Microsoft®, Sybase®, IBM® (International Business Machines), and/or variations thereof.

In at least one embodiment, a server 504 is able to provide feeds and/or real-time updates for media feeds. In at least one embodiment, a server 504 is part of multiple server boxes spread over an area but functioning for a presently described process for analysis of a porous formation. In at least one embodiment, server 504 includes applications to measure network performance by network monitoring and traffic management. In at least one embodiment, a provided database 502 enables information storage from a wellsite, including user interactions, usage patterns information, adaptation rules information, and other information.

While techniques herein may be subject to modifications and alternative constructions, these variations are within spirit of present disclosure. As such, certain illustrated embodiments are shown in drawings and have been described above in detail, but these are not limiting disclosure to specific form or forms disclosed; and instead, cover all modifications, alternative constructions, and equivalents falling within spirit and scope of disclosure, as defined in appended claims.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Recitation of ranges of values herein are merely intended to serve as a shorthand method of referring individually to each separate value falling within range, unless otherwise indicated herein and each separate value is incorporated into specification as if it were individually recited herein. In at least one embodiment, use of a term, such as a set (for a set of items) or subset unless otherwise noted or contradicted by context, is understood to be nonempty collection including one or more members. Further, unless otherwise noted or contradicted by context, term subset of a corresponding set does not necessarily denote a proper subset of corresponding set, but subset and corresponding set may be equal.

Conjunctive language, such as phrases of form, at least one of A, B, and C, or at least one of A, B and C, unless specifically stated otherwise or otherwise clearly contradicted by context, is otherwise understood with context as used in general to present that an item, term, etc., may be either A or B or C, or any nonempty subset of set of A and B and C. In at least one embodiment of a set having three members, conjunctive phrases, such as at least one of A, B, and C and at least one of A, B and C refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, terms such as plurality, indicates a state of being plural (such as, a plurality of items indicates multiple items). In at least one embodiment, a number of items in a plurality is at least two but can be more when so indicated either explicitly or by context. Further, unless stated otherwise or otherwise clear from context, phrases such as based on means based at least in part on and not based solely on.

Operations of methods in FIG. 4 and the algorithm herein can be performed in any suitable order unless otherwise indicated herein or otherwise clearly contradicted by context. In at least one embodiment, a method includes processes such as those processes described herein (or variations and/or combinations thereof) that may be performed under control of one or more computer systems configured with executable instructions and that may be implemented as code (e.g., executable instructions, one or more computer programs or one or more applications) executing collectively or exclusively on one or more processors, by hardware or combinations thereof.

In at least one embodiment, such code may be stored on a computer-readable storage medium. In at least one embodiment, such code may be a computer program having instructions executable by one or more processors. In at least one embodiment, a computer-readable storage medium is a non-transitory computer-readable storage medium that excludes transitory signals (such as a propagating transient electric or electromagnetic transmission) but includes non-transitory data storage circuitry (such as buffers, cache, and queues) within transceivers of transitory signals. In at least one embodiment, code (such as executable code or source code) is stored on a set of one or more non-transitory computer-readable storage media having stored thereon executable instructions (or other memory to store executable instructions) that, when executed (such as a result of being executed) by one or more processors of a computer system, cause computer system to perform operations described herein.

In at least one embodiment, a set of non-transitory computer-readable storage media includes multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit (CPU) executes some of instructions while other processing units execute other instructions. In at least one embodiment, different components of a computer system have separate processors and different processors execute different subsets of instructions.

In at least one embodiment, computer systems are configured to implement one or more services that singly or collectively perform operations of processes described herein and such computer systems are configured with applicable hardware and/or software that enable performance of operations. In at least one embodiment, a computer system that implements at least one embodiment of present disclosure is a single device or is a distributed computer system having multiple devices that operate differently such that distributed computer system performs operations described herein and such that a single device does not perform all operations.

In at least one embodiment, even though the above discussion provides at least one embodiment having implementations of described techniques, other architectures may be used to implement described functionality, and are intended to be within scope of this disclosure. In addition, although specific responsibilities may be distributed to components and processes, they are defined above for purposes of discussion, and various functions and responsibilities might be distributed and divided in different ways, depending on circumstances.

In at least one embodiment, although subject matter has been described in language specific to structures and/or methods or processes, it is to be understood that subject matter claimed in appended claims is not limited to specific structures or methods described. Instead, specific structures or methods are disclosed as example forms of how a claim may be implemented.

From all the above, a person of ordinary skill would readily understand that the tool of the present disclosure provides numerous technical and commercial advantages and can be used in a variety of applications. Various embodiments may be combined or modified based in part on the present disclosure, which is readily understood to support such combination and modifications to achieve the benefits described above.

It should be appreciated that embodiments herein may utilize one or more values that may be experimentally determined or correlated to certain performance characteristics based on operating conditions under similar or different conditions. The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A well inspection method, comprising:
   transmitting an acoustic signal from a well inspection tool into a well structure;
   receiving return signals from the well structure at an array of receivers on the well inspection tool;
   performing, using at least one processor associated with the well inspection tool, Short-Term Fourier Transform (STFT) on the return signals to generate spectrogram data;
   determining short-term power spectra from the spectrogram data;
   identifying time-dependent frequency response patterns and location-dependent waveform propagation patterns of the short-term power spectra; and
   determining cement bonding conditions based on pattern matching using the time-dependent frequency response patterns and using the location-dependent waveform propagation patterns.

2. The well inspection method of claim 1, further comprising:
   enabling an acoustic transmitter of the well inspection tool to perform the transmitting of the acoustic signal from the well inspection tool into the well structure.

3. The well inspection method of claim 1, further comprising:
   retrieving measurement data from the return signal; and
   enabling the at least one processor to access the measurement data and to access patterns of known cement-bonding conditions to perform the pattern matching using the time-dependent frequency response patterns and using the location-dependent waveform propagation patterns.

4. The well inspection method of claim 1, further comprising:
   performing the Short-Term Fourier Transform (STFT) on individual ones of the return signals to generate individual ones of spectrograms that are cumulated to generate the spectrogram data.

5. The well inspection method of claim 1, further comprising:
   determining partial energies of the return signals at selected time segments from the spectrogram data, the partial energies to be comprised in the short-term power spectra.

6. The well inspection method of claim 1, further comprising:
   using partial energies of the return signals at selected time segments from the spectrogram data to perform the identification of the time-dependent frequency response patterns and location-dependent waveform propagation patterns.

7. The well inspection method of claim 1, further comprising:
   comparing the time-dependent frequency response patterns and the location-dependent waveform propagation patterns with second time-dependent frequency response patterns and second location-dependent waveform propagation patterns from known cement-bonding conditions to enable the determination of the cement bonding conditions.

8. A system for well inspection, comprising:
a well inspection tool to transmit an acoustic signal into a well structure;
an array of receivers on the well inspection tool to receive return signals from the well structure; and
at least one processor and memory comprising instructions that when executed by the at least one processor enable the system to:
perform Short-Term Fourier Transform (STFT) on the return signals to generate spectrogram data;
determine short-term power spectra from the spectrogram data;
identify time-dependent frequency response patterns and location-dependent waveform propagation patterns of the short-term power spectra; and
determine cement bonding conditions based on pattern matching using the time-dependent frequency response patterns and using the location-dependent waveform propagation patterns.

9. The system of claim 8, further comprising:
an acoustic transmitter of the well inspection tool to generate the acoustic signal and to perform the transmitting of the acoustic signal from the well inspection tool into the well structure.

10. The system of claim 8, wherein the at least one processor and the memory comprising the instructions that when executed by the at least one processor further enable the system to:
retrieve measurement data from the return signal; and
enable the at least one processor to access the measurement data and to access patterns of known cement-bonding conditions to perform the pattern matching using the time-dependent frequency response patterns and using the location-dependent waveform propagation patterns.

11. The system of claim 8, wherein the at least one processor and the memory comprising the instructions that when executed by the at least one processor further enable the system to:
perform the Short-Term Fourier Transform (STFT) on individual ones of the return signals to generate individual ones of spectrograms that are cumulated to generate the spectrogram data.

12. The system of claim 8, wherein the at least one processor and the memory comprising the instructions that when executed by the at least one processor further enable the system to:
determine partial energies of the return signals at selected time segments from the spectrogram data, the partial energies to be comprised in the short-term power spectra.

13. The system of claim 8, wherein the at least one processor and the memory comprising the instructions that when executed by the at least one processor further enable the system to:
use partial energies of the return signals at selected time segments from the spectrogram data to perform the identification of the time-dependent frequency response patterns and location-dependent waveform propagation patterns.

14. The system of claim 8, wherein the at least one processor and the memory comprising the instructions that when executed by the at least one processor further enable the system to:
compare the time-dependent frequency response patterns and the location-dependent waveform propagation patterns with second time-dependent frequency response patterns and second location-dependent waveform propagation patterns from known cement-bonding conditions to enable the determination of the cement bonding conditions.

* * * * *